United States Patent [19]

Ikeda et al.

[11] Patent Number: 4,884,934
[45] Date of Patent: Dec. 5, 1989

[54] JUNCTION BOLT WITH ADJUSTABLE CLAMPING FORCE

[75] Inventors: Takashi Ikeda; Euji Tsunoda, both of Yokohama, Japan

[73] Assignee: Kabushiki Kaisha Toshiba, Kawasaki, Japan

[21] Appl. No.: 101,030

[22] Filed: Sep. 25, 1987

[30] Foreign Application Priority Data

Oct. 1, 1986 [JP] Japan .................................. 61-233989

[51] Int. Cl.⁴ .............................................. F16B 35/02
[52] U.S. Cl. ..................................... 411/383; 411/384; 411/395; 411/914; 411/916; 29/405; 29/446; 29/525.1; 277/125; 277/165; 277/190
[58] Field of Search ................... 411/19, 23, 324, 263, 411/916, 914, 383–384, 395, 427, 542, 8, 9, 14; 29/446, 405, 526 R, 525.1; 285/351, 347, 18, 35; 277/165, 170, 125, 190

[56] References Cited

U.S. PATENT DOCUMENTS

| | | | |
|---|---|---|---|
| 546,314 | 9/1895 | Farrey | 285/351 X |
| 2,190,419 | 2/1940 | Evarts | 285/351 X |
| 2,320,398 | 6/1943 | Zetterquist | 411/916 X |
| 2,934,968 | 5/1960 | Neumann et al. | 411/383 X |
| 3,130,628 | 4/1964 | Blinn | 411/916 X |
| 3,209,640 | 10/1965 | Waivers | 411/395 |
| 3,835,523 | 9/1974 | Stansfield | 411/395 X |
| 3,947,948 | 4/1976 | Fredricksson et al. | 411/383 X |
| 4,192,519 | 3/1980 | Buggele | 277/125 X |
| 4,637,640 | 1/1987 | Fournier et al. | 285/351 X |
| 4,718,282 | 1/1988 | Bonfils | 73/862.62 X |

FOREIGN PATENT DOCUMENTS

| | | | |
|---|---|---|---|
| 643632 | 8/1962 | Italy | 277/125 |
| 56-12903 | 2/1981 | Japan . | |
| 2074277 | 10/1981 | United Kingdom | 285/351 |

OTHER PUBLICATIONS

"Steam turbine-maintenance to upgrade performance" by H. G. A. Werner, ASEA. Stahl, Sweden, May 1986.
Catalogue of Hydra-Tight Limited Company Company.

Primary Examiner—Gary L. Smith
Assistant Examiner—Douglas E. Ringel
Attorney, Agent, or Firm—Oblon, Spivak, McClelland, Maier & Neustadt

[57] ABSTRACT

A junction bolt for joining members by use of clamping nuts engaged with the junction bolt is provided with an axial inner hollow hole in which a piston member is located so as to define a space between the outer peripheral surface of the piston member and the inner wall of the junction bolt. The space is divided by a sealing member into a pressurizing space into which a pressurized fluid is introduced and a temperature adjusting space into which a heat medium is introduced. In the bolt clamping force adjusting method, the temperature of the junction bolt is first adjusted to a predetermined temperature and an extending amount of the junction bolt to be caused when an aimed clamping force is applied at this predetermined temperature. The pressurized fluid having a pressure corresponding to one required for causing the calculated extending amount is introduced into the pressurizing space to thereby extend the junction bolt body, and under the extended condition, the bolt is clamped by the clamping nuts till the nuts closely contact to the members to be joined. Finally, the pressurized fluid is discharged to contract the junction bolt so as to set the clamping force to a predetermined value.

21 Claims, 10 Drawing Sheets

HEATING MEDIUM SUPPLY PORT   HEATING MEDIUM DISCHARGE PORT

JUNCTION BOLT WITH ADJUSTABLE CLAMPING FORCE

FIELD OF THE INVENTION

This invention relates to a junction bolt for joining machine parts or members together, and more particularly, to a junction bolt having a structure capable of easily adjusting a clamped force of the joined members and a method of adjusting the clamping force of the members to be joined in use of the junction bolt of the character described above.

BACKGROUND OF THE INVENTION

Conventionally, casings and flanges of a machinery such as steam turbine or the like are mutually joined by means of junction or fastening bolts, and the clamping force of the junction bolts are preliminarily adjusted so as to maintain a predetermined clamping force in consideration of a temperature at the operation time of the machinery.

An example in which the conventional junction bolts of the type described above are utilized for the joined portion of casings of a steam turbine will be described hereinbelow for the better understanding of this technical art of field.

A steam turbine is generally equipped with a pair of upper and lower casing parts of inner and outer casings which are mutually joined by the junction bolts, and a force acting on the junction bolt is influenced with not only steam pressures in the inner and outer casings but also tensioning force in the axial direction of the junction bolt for strongly fastening the upper and lower casing parts. In addition, a stress resisting against thermal deformation due to high temperature steam at a turbine operation time will also be considered. These forces and stresses acting on the junction bolts will constitute considerably large values.

In order to support or hold such a large stress, the size or diameter of the junction bolt is made large. For example, with a power generation steam turbine having power generation capability of about 500 MW, junction bolts each having a diameter of 165 mm are used for joining the casing parts of the inner and outer casings. It is therefore difficult to clamp these large junction bolts in use of an ordinary clamping tool.

In a prior art technique, taking the above defect into consideration, is adopted a method in which an electric heater is inserted into a hollow hole bored in the junction bolt thereby to heat the junction bolt and hence to temporarily extend the same in the axial direction thereof. The thus extended junction bolt is then clamped by means of clamping nuts. This method, however, requires much time and labour for inserting and drawing the heater into and out of the hollow hole of the junction bolt.

In another method of the conventional technique, highly heated air or specific gas of high heat capacity is fed into the hollow hole of the junction bolt in an alternation of the electric heater to thereby axially extend the junction bolt. This method, however, also involves a problem of requiring much time to heat the junction bolt to the desired temperature. With a technical view point, this method is in principle based on the difference of thermal expansion between the flange portions of the casings of the steam turbine and the junction bolts for joining the same. Accordingly, a necessary procedure will have to be taken for preventing the flange portions from temperature rising. In actual operation, for this purpose, the number of the junction bolts to be simultaneously heated must be limited to locally carry out the bolt heating operation, which adversely results in extended and divided working times, thus being noneconomical and reducing the working efficiency.

Moreover, in the method in which a heated air or gas is utilized, the respective members or parts are likely to be subjected to the thermal deformation because of the high temperature heating of the junction bolts, and the substances of the members will be themselves degraded. Particularly, in the high temperature gas heating method, there is a high possibility of corrosion of the inner surface of the hollow hole of the junction bolt due to the high temperature oxidization based on the used gas, and there is a fear of lowering the strength of the junction bolt.

Conventionally, the method of thermally elongating the junction bolt and clamping the same in the extended state has been generally adopted in a case where a clamping torque of the extent that cannot be obtained by the manual force, for example, more than about 50 $kg \times m/s^2$, is required. Particularly, with the steam turbine, this method is generally adopted in a case where a junction bolt having a diameter of more than about 50 mm is utilized.

In another aspect of the prior technique for eliminating or simplifying the joining working or operation, although a torque wrench operated by a hydraulic mechanism has been utilized, a twist-back force will be applied to the junction bolt in use of the torque wrench. Accordingly, the junction bolt has to be designed in the strength, in consideration of the combined stress of the shearing stress due to the twist-back force and the tension stress due to the extension of the junction bolt. For this reason, it is required on the matter of design to restrict the allowable tension stress below about 83% of the possible durable force of the junction bolt, which is based on the generally known shearing stress energy theory, and which may result in a fear of ensuring no adequate clamping force for the junction bolt in a certain case. Moreover, the torque wrench equipped with the hydraulic mechanism constitutes a heavy equipment and requires a wide working space around the joining portion. In some case, it will be necessary to use a crane for moving or conveying the torque wrench, thus lacking in maneuverability of the working.

The problems or disadvantages described above in the prior technique are items to be improved in the assembling or disassembling working of the steam turbine mainly at a time of periodical inspection thereof. Additionally, other problems have been encountered in the prior technique at a time of actual operation of the steam turbine in a view point of the strength maintenance of the joined portions as described hereunder.

With the machinery such as steam turbines which is usually operated in a high temperature condition, junction means such as bolts has to be re-clamped optionally because the clamping force or clamped condition at the joined portions is varied as time passes due to the thermal expansion or creeping phenomenon.

As a matter of design, in general, it is considered to select the materials of the members to be joined and the junction bolts so that the thermal expansion efficiencies of the materials constituting both the members are approximately equal or similar to each other to counterbalance the mutual effect due to the thermal expansions of both the members.

In an actual operation, however, apart from the above-mentioned ideal condition, the clamping force of the junction bolt (i.e., the clamping stress to the junction bolt body) is often lowered as time passes by the synergism of the creeping phenomenon and the temperature variation in wide range. Particularly, in a case where the thermal expansion efficiency of the junction bolt is larger than that of the member to be joined, the clamping force of the junction bolt lowers as the operation temperature rises, which results in a fear of leaking a highly pressurised fluid such as steam. This tendency has been remarkably observed according to the development of the daily load-following turbine operation mode, for example, in which the operation temperature is frequently varied in a relatively short time interval in response to a required amount of the steam turbine.

In order to obviate the lowering of the clamping force of the junction bolt due to the thermal expansion, in an improved structure of a conventional steam turbine, a steam introduction tube is located to communicate respectively with a plurality of bolt holes formed in the flange portions of the casings so as to cool the junction bolt body or to heat the flange portions to be joined together by introducing steam of a predetermined temperature through the steam introduction tube, thereby preventing the lowering of the clamping force.

The flange portion, however, is generally formed with relatively large thickness and a wide surface area, so that it is considerably difficult to transfer the heat into the interior of the flange portion, and in a certain operating condition, the junction bolt body with a relatively small thermal capacity may be first extended before the flange portion is extended. This may result in the lowering of the clamping force, and in some adverse case, there is a fear of the leakage of the steam.

OBJECTS OF THE INVENTION

A primary object of this invention is to substantially eliminate defects or drawbacks encountered in the prior art technique as described above and to provide an improved junction bolt having construction capable of extremely improving the working efficiency in the joining operation of members to be joined together, preventing the junction bolt from degrading in the quality during the joining working, and attaining high reliability for the strength thereof.

Another object of this invention is to provide a method of adjusting the clamping force of the junction bolt in which the clamping force can be easily adjusted precisely in response to the operation change of machinery such as a steam turbine plant even during the operation thereof.

A further object of this invention is to provide a junction bolt provided with an improved sealing means capable of effectively achieving the clamping force adjusting method for the junction bolt.

SUMMARY OF THE INVENTION

These and other objects can be achieved, in one aspect of this invention, by providing an improved junction bolt adapted to clamp members to be joined together in use of clamping nuts, the junction bolt comprising a bolt body provided with an inner axial hollow hole having one open end and the other closed end, a piston member coaxially located in the hollow hole with space between the outer peripheral surface of the piston member and an inner wall of the bolt body defining the hollow hole, a blind plug adapted to close the open end of the hollow hole, and a sealing member located on the outer peripheral surface of the piston member to separate the space into a pressurizing space into which a pressurizing fluid is introduced and a temperature adjusting space into which a heat medium is introduced.

In another aspect of this invention, there is provided a method of adjusting a clamping force of a junction bolt having the construction as set forth hereinabove, which is characterized by the steps of introducing a heat medium into the temperature adjusting space to adjust the temperature of the bolt body to a predetermined temperature, calculating an axial extending amount of the bolt body caused when a clamping force aimed at the predetermined temperature is applied to the bolt body, introducing into the pressurizing space a pressurized fluid having a pressure corresponding to one adapted to cause the calculated extending amount thereby to axially extend the bolt body, clamping the clamping nuts in the extended state of the bolt body till the clamping nuts closely contact to the members to be joined together, and finally discharging the pressurized fluid from the pressurizing space so as to contact the bolt body, thereby to set a clamping force to a predetermined value.

Description of this invention inclusive of advantages and merits attained thereby will be made clearer by way of preferred embodiments illustrated in the accompanying drawings.

DESCRIPTION OF THE PRIOR ART

Before the description of the preferred embodiments of this invention, for the better understanding thereof, the background art of this invention will be described hereunder in conjunction with FIGS. 12 through 16.

Figure 12:
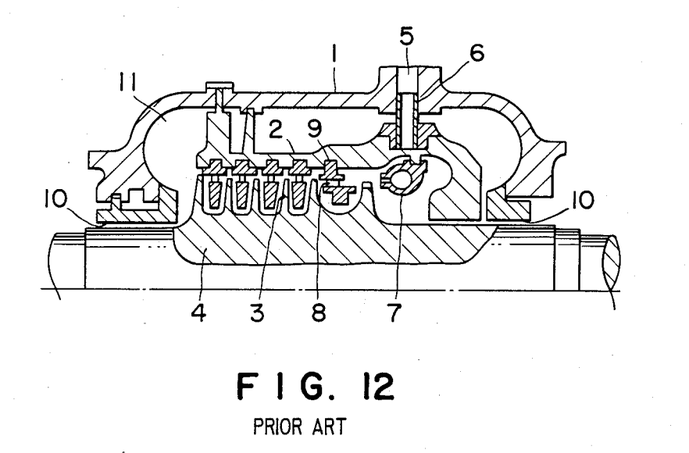
FIG. 12 shows a cross-sectional view of a portion of the general type steam turbine to which the junction bolt of this invention is adopted.

FIG. 12 shows a sectional view of a main part of a steam turbine of the general type, for example as disclosed in Japanese patent application No. 78196/1983, in which an inner casing 2 is disposed inside an outer casing 1, and a rotor 4 provided with turbine blades 3 are located in the inner casing 2. The outer casing 1 is provided with a steam supply port 5 to which is fitted an expandable communication tube 6 which is in turn connected to an annular nozzle box 7 disposed in the inner casing 2. Diaphragms 9 provided with nozzles 8 are fitted to the inner wall of the inner casing 2. The diaphragms 9 form a turbine stage together with the turbine blades 3. Gland packings 10 are fitted into both end portions of the outer casing 1, respectively, thereby to constitute a sealing mechanism for the shaft of the rotor 4.

With the steam turbine having the structure described above, the steam of a high temperature and under high pressure is introduced from the steam supply port 5 into the annular nozzle box 7 through the communication tube 6 and then guided through the nozzle opening of the nozzle box 7 as high-speed steam so as to collide with the turbine blades 3. The collision of this high-speed steam imparts a kinetic energy to the rotor 4 through the turbine blades 3. The steam is thereafter throttled and guided into the succeeding turbine stage as high-speed gas through the nozzles 8 of the respective diaphragms 9. This process is succeedingly repeated, and the steam passing the final turbine stage is fed into an intermediate or lower pressure turbine through an outlet port 11 of the high pressure stage illustrated in FIG. 12.

Figure 13:
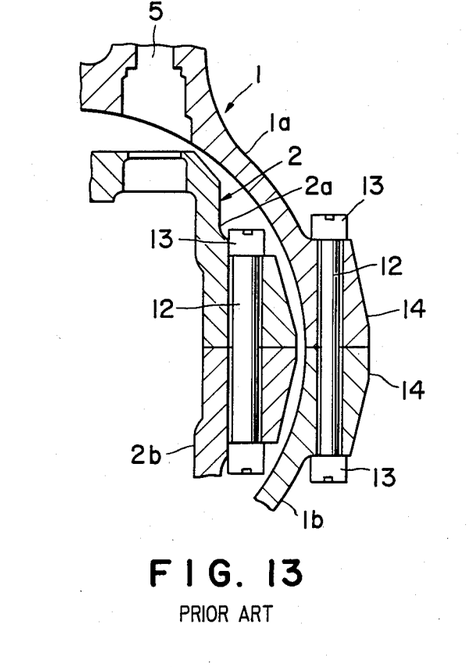
FIG. 13 shows a sectional view of a portion to be joined of the steam turbine shown in FIG. 12.

In general, the outer and inner casings 1 and 2 for airtightly accommodating the rotor 4 are conveyed to the working place or operating portion respectively in a state split into upper and lower two parts as shown in FIG. 13. The split upper and lower casing parts 1a, 1b and 2a, 2b of the outer and inner casings 1 and 2 are joined together by clamping means comprising junction bolts 12 and clamping nuts 13 which clamp the corresponding bolts 12 at both ends thereof.

The portions to be joined of the respective casing parts 1a, 1b and 2a, 2b are usually formed as flange portions 14 each of which has a relatively large thickness to ensure the rigidity strength of the casings. Accordingly, the casings 1 and 2 are clamped by penetrating the junction bolts 12 through the flange portions 14 and strongly clamping the respective bolts 12 by means of the clamping nuts 13 thereby ensuring the airtightness of the inner pressure of the casings 1 and 2.

According to the clamping method for the steam turbine casings described hereinabove, however, the force acting on the junction bolts 12 is affected with not only the steam pressures in the inner and outer casings 1 and 2 but also tensioning force in the axial direction of the bolts 12 for strongly fastening the upper and lower casing parts. In addition, a stress resisting against thermal deformation due to the high-temperature steam at a turbine operation will also be considered. These forces and stresses acting on the junction bolts 12 will constitute considerably large values.

Based on the above facts, according to the prior art technique with the clamping force adjusting method of the junction bolts, several problems or disadvantages are encountered as disclosed hereinbefore in the background of this art of field.

Figure 14:
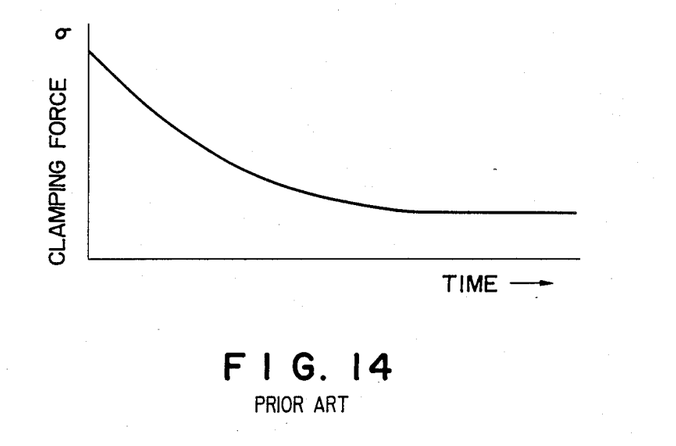
FIG. 14 is a graph showing the variation in time of the clamping force in use of a junction bolt of the conventional type.

In this connection, FIG. 14 shows an example of the variation of the clamping force of the junction bolt as time passes, and the graph shows the fact that the clamping force gradually lowers.

Figure 15:
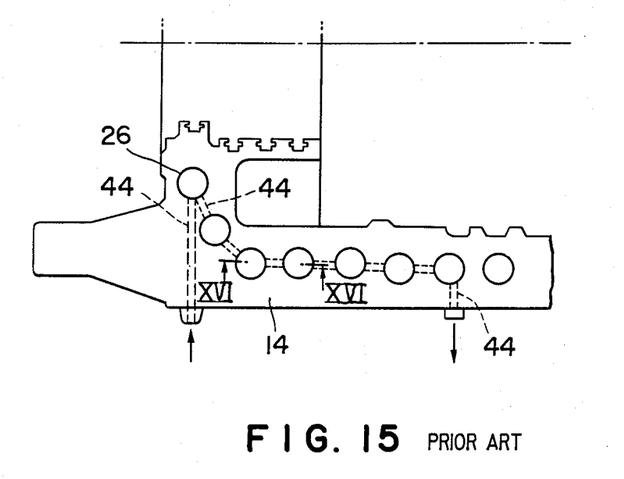
FIG. 15 is a schematic plan view showing a temperature adjusting mechanism of the conventional type for adjusting the temperature of the junction bolt and neighboring members.
Figure 16:
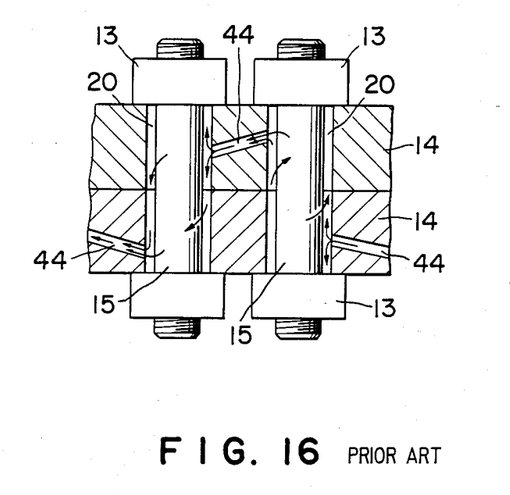
FIG. 16 is a cross-sectional view taken along the line XVI—XVI shown in FIG. 15.

In one improved aspect, as shown in FIGS. 15 and 16, in order to obviate the lowering of the clamping force of the junction bolts 12 due to the thermal expansion, in an improved structure of the conventional steam turbine, a steam introduction tube 44 is located to communicate respectively with a plurality of bolt holes 20 formed in the flange portions 14 of the casings 1 and 2 so as to cool a junction bolt body 15 or to heat the flange portion 14 to be joined by introducing the steam with a predetermined temperature through the steam introduction tube 44, thereby preventing the lowering of the clamping force.

Even in this improved method, however, there remain problems or disadvantages as described hereinbefore.

DETAILED DESCRIPTION OF THE PRESENTLY PREFERRED EMBODIMENTS

Taking the technique of this art into consideration, a preferred embodiment according to this invention will be described hereinbelow in conjunction with accompanying drawings for substantially eliminating or solving the problems or disadvantages encountered in the prior art technique.

THE FIRST EMBODIMENT

Figure 1:
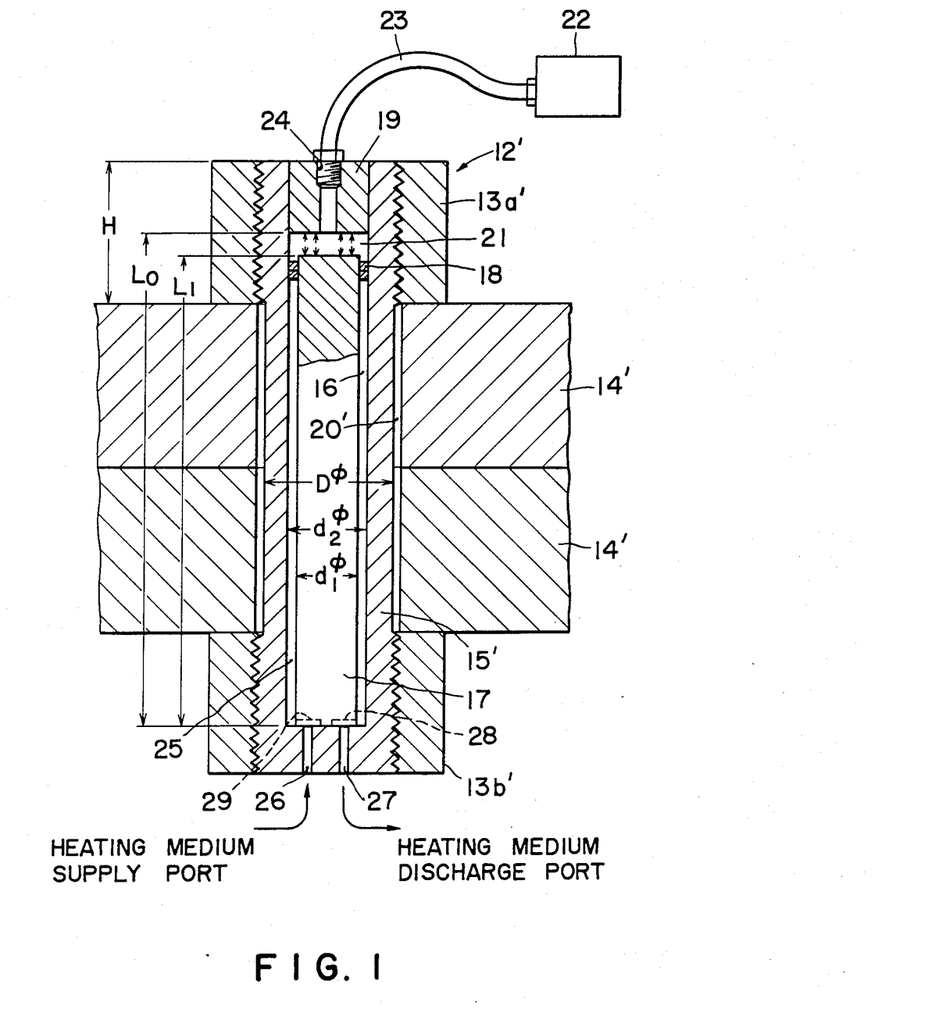
FIG. 1 is a vertical elevation of a junction bolt according to this invention.

FIG. 1 is a vertical sectional view of a junction bolt according to this invention, in which a junction bolt 12' is inserted and fitted into a bolt hole 20' bored through flange portions 14' of casings of a steam turbine. Both the ends of the junction bolt 12' are fastened by clamping nuts 13a and 13b. An axial hollow hole or bore 16 having an inner diameter of $d_2\phi$ and a length of $L_0$ is formed in substantially the axial central portion of the junction bolt body 15' having an outer diameter of $D\phi$. A piston 17 having a length $L_1$ slightly shorter than the hole length $L_o$ is accommodated in the axial hollow hole 16, and as shown in FIG. 1, sealing means or device 18 is mounted around the upper end of the piston 17 to tightly seal the space between the inner wall of the junction bolt 12' and the outer surface of the piston 17. A blind plug 19 as a blind patch is fitted into an end opening of the hollow hole 16 to seal the same, and the blind plug 19 is fitted by screw connection or welding connection.

The junction bolt body 15' is generally made of a chrome-molybdenum-vanadium steel (CrMoV steel) or 12-chrome-vanadium-tungsten steel (12CrVW steel). These steels are, however, liable to be thermally brittle, and in a usual welding operation, it is difficult to work these steels. It is therefore liable to form pin-holes and difficult to achieve substantially complete air-tightness. Accordingly, it is desired that the fitting of the blind plug 19 is carried out by an electron-beam welding method which requires less welding heat amount and obtains substantially complete airtightness.

The lower end of the piston 17, as viewed in FIG. 1, contacts to the bottom of the hollow hole 16 of the junction bolt 12', and a pressurizing space 21 into which a pressurized fluid is introduced is defined between the upper end of the piston 17, i.e. the upper side of the sealing means 18, and the bottom of the fitted blind plug 19. The blind plug 19 is provided with an axial through hole having a connection port 24 to which is connected a hose 23 through which the pressurized fluid is supplied into the pressurizing space 21 from a pressurized fluid supply pump 22. A header, not shown, may be located on the way of the hose 23 from which a plurality of branch hoses are connected to the connection ports of the respective junction bolts 12' to thereby clamp the plurality of bolts simultaneously.

An annular temperature adjusting space 25 is defined between the inner wall of the junction bolt 12' and the outer surface of the piston 17 at the lower side of the sealing means 18 for introducing a heating medium to thereby adjust the temperature of the junction bolt 12'. A heating medium supply port 26 and a heating medium discharge port 27 for introducing and discharging the heating medium are provided, for example, at the closed end of the bottom portion of the junction bolt body 15', and these ports 26 and 27 are communicated with the temperature adjusting space 25 through communication grooves 28 and 29, respectively, which are formed at the lower end portion of the piston 17. These communication grooves 28 and 29 can also serve as discharge grooves for discharging out of the bolt body 15' the pressurized fluid leaking from the pressurizing space 21 into the temperature adjusting space 25. The locations of the pressurizing space 21 and the temperature adjusting space may be altered to the inverted positions to those shown in FIG. 1.

A method of joining the flange portions 14' of the turbine casing in use of the junction bolts 12' each having the structure described hereinabove will be disclosed hereunder.

The junction bolts 12' are first inserted into the bolt holes 20 formed through the flange portion 14' of the casings of the steam turbine, and both the ends of the respective junction bolts 12' are clamped by means of nuts 13a and 13b by use of an ordinary clamping tool. The hose 23 extending from the pressurized fluid supply pump 22 is connected to the connection port 24 of the blind plug 19 to supply the pressurized fluid into the pressurizing space 21 defined in each junction bolt 12' as a pressurizing space.

The pressurized fluid supplied in the pressurizing space 21 presses the piston 17 so as to extend the junction bolt 12' in the axial direction, and the pressing force Fo for extending the junction bolt 12' is expressed by the following equation:

$$Fo = \frac{\pi}{4} d2^2 \times p \quad (1)$$

where d2 designates an inner diameter of the hollow hole 16 of the junction bolt 12' and p is a pressure of the pressurized fluid.

A force F for extending the length by $\Delta l$ of the junction bolt 12' having an effective length l, an outer diameter D, and an inner diameter d2 of the hollow hole thereof will be expressed as follows:

$$F = \frac{\pi}{4}(D^2 - d2^2) \cdot \frac{\Delta l}{l} \times E \quad (2)$$

where capital E designates a Young's modulus of the material constituting the junction bolt 12'.

The fluid pressure for causing the junction bolt 12' to extend by $\Delta l$ is therefore derived from the equations (1) and (2) as follows:

$$P = \left(\frac{D^2}{d2^2} - 1\right) \times \frac{\Delta l}{l} \times E \quad (3)$$

Accordingly, in the actual operation, the pressurized fluid having a pressure thus derived from the equation (3) is supplied to axially extend the junction bolt body 15' by the length $\Delta l$, and the heat medium is then fed into the temperature adjusting space 25 to adjust the temperature of the junction bolt 12' to a predetermined temperature. In these conditions, the junction bolt 12' is clamped with the nuts 13a, 13b in use of the known clamping tool, and the pressurized fluid is thereafter discharged to release the axial tension stress applied by the pressurized fluid upon releasing the tension stress. The axial length of the junction bolt body 15' will be reduced, but this tendency is restricted by the thickness of the members to be joined together, and, therefore, a tension force corresponding to a force required for extending the bolt body 15' by the length $\Delta l$ is caused as a clamping force.

For example, with a power generation steam turbine having a power of about 500 MW, a pressure P of the pressurized fluid required in use of these junction bolts will be calculated as follows.

Where the outer diameter D of the junction bolt 12' is 159 mm, the inner diameter d2 thereof is 100 mm, the Young's modulus E is 21,000 kg/mm$^2$, and the extending ratio ($\Delta l/l$) is about 0.2%, the pressure P of the pressurized fluid is calculated from the equation (3) as about 6420 kg/cm$^2$. In other words, it will be said that the junction bolt 12' can be extended in its axial length by 2/1000 of the effective length thereof by supplying the pressurized fluid of 6420 kg/cm$^2$ into the pressurizing space 21. In general, the pressure of the pressurized fluid of about 12,000 kg/cm$^2$ will be a design limit for the junction bolt of this character.

According to the construction of the junction bolt of this invention described above, since a mechanism for extending the junction bolt body in its axial direction is disposed in the junction bolt itself, the extention necessary for the clamping of the bolt can be preliminarily imparted to the junction bolt body by the axially extending mechanism. In these conditions, the junction bolt can be clamped by screwing the clamping nuts fitted at both the ends thereof. Accordingly, the clamping force can be imparted to the junction bolt by applying only the simple axial tension force without causing a shearing force due to the returning stress to the junction bolt body, thus remarkably simplifing the bolt clamping working. In fact, it was proved that one junction bolt can be clamped in only a few minutes. In comparison, in the clamping operation of the junction bolts in application of the conventional heating method, described hereinbefore, three days were required for joining together a pair of casings of a steam turbine. In contrast, in use of the junction bolts of this invention, the clamping operation can be performed in only two or three hours. Thus the working time is remarkably reduced to about one twentieth.

In addition, in case of screwing the clamping nuts of the junction bolt, the nuts can be clamped with relatively small force by means of a conventional clamping tool, so that less returning stress acts on the junction bolt body. This means that the tension proof stress of the junction bolt may be taken to be the maximum allowable stress, in comparison with the conventional technique, in which the maximum allowable stress is a combination of the tension stress and the shearing stress due to the returning force. Accordingly, the invention obtains an improved strength in the design matter.

Moreover, according to the clamping method of this invention, the management of the extending amount of the junction bolt can be easily done by paying attention to observation of the scale of a pressure gauge displaying the pressure of the pressurized fluid, thus remarkably simplifying the working management or maintenance. With this connection, in the conventional clamping method, the extending amount of the junction bolt body is preliminarily ascertained before and after the heat applying operation or after the cooling operation by means of a measuring intrument such as a strain gauge. In case of obtaining an insufficient amount, the junction bolt body is again heated to additional clamp the same, and after quenching, the extending amount has to be measured again. These processes or workings are troublesome and complicated. However, the clamping method of this invention can substantially eliminate these workings, thus effectively improving the working efficiency.

Furthermore, in another view point, since the junction bolt is extended by means of the pressurized fluid, the clamping working can be performed at the room temperature. This advantage can prevent the junction bolt body from being thermally deformed or rendered fragile, and it improves the reliability of the junction bolt in the substance and function thereof in comparison with the conventional clamping method in which a high temperature heat source such as an electric heater is to be utilized.

In the forgoing description, although an application of the junction bolt according to this invention is referred to for assembling turbine casings as one preferred example, the aforementioned method can be applied in reverse manner for disassembling the turbine casings. Namely, in loosening the clamping nuts and removing the junction bolts from the joined members, a pressurized fluid having a pressure slightly higher than that supplied for extending the junction bolt body is fed to further extend the same, and in this condition, the clamping nuts can easily be screwed off.

As a pressurized fluid to be fed into the pressurizing space in the junction bolt body, it is desired to use a noncompressible fluid such as water or hydraulically operable oil, but of course any other fluid may be utilized.

It will be easily understood that the volume of the pressurizing space is constructed as small as possible for the rapid or smooth pressurizing operation, and for this purpose, it is desirable to locate the sealing means 18 at the end portion of the outer periphery of the piston 17 near the pressurizing space 21.

It will also be preferred to define the pressurizing space 21 at substantially middle portion of the axial length H of the clamping nut 13a in the clamped condition as shown in FIG. 1 in consideration of the strength of the junction bolt. This is because the radial deformation of the junction bolt body 15' due to the pressure of the pressurized fluid supplied into the pressurizing space 21 can be effectively suppressed by the rigidity of the clamping nut 13a.

As is apparent from the example of the junction bolts adapted to join the casings of the steam turbine, the junction bolt is not only mounted in the assembling or disassembling working of the turbine at the normal temperature but also handled for adjusting the clamping force in the high temperature operating condition. It is therefore desired to construct the parts constituting the junction bolt with material having the same thermal expansion efficiencies, thereby maintaining the space or gap between the hollow hole formed in the junction bolt and the piston located therein and thus preventing the pressurized fluid from leaking through the sealed portion.

FIGS. 2 through 5 show detailed or concrete structures of the sealing means provided for the junction bolt according to this invention.

Figure 2:
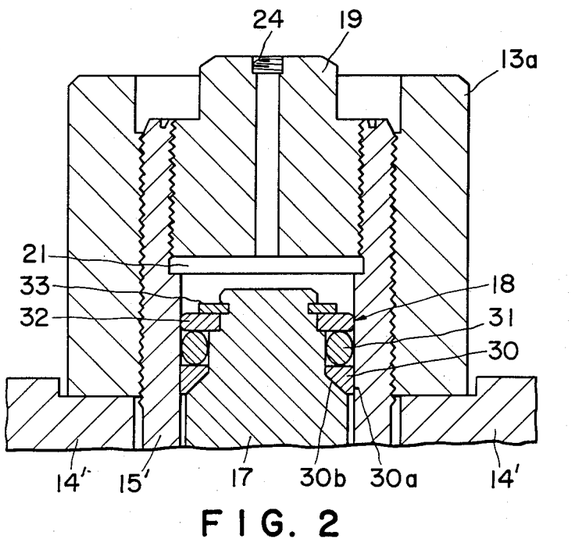
FIGS. 2 through 5 show a part of the junction bolt for particularly showing various types of sealing means utilized for the junction bolt of this invention.

A sealing device shown in FIG. 2 comprises a lower seal ring 30 formed so as to have substantially a triangular cross-section and a step-like configuration from the outer periphery of the upper end of the piston 17 towards the inner wall of the hollow hole 16 of the junction bolt 12' and made of an elastically deformable metal such as silver or copper, an O-ring 31 made of a hardened rubber or carbon, and an upper seal ring 32 having substantially a rectangular cross-section, which members 30, 31 and 32 are laminated in this order. A stop ring 33 is located for securing the upper seal ring 32 of the sealing device 18 for preventing these members from dropping out, the stop ring 33 being made of an elastic material such as carbon.

The lower seal ring 30 is provided with two sealing surfaces, one being an outer sealing surface 30a and the other being an inner tapered sealing surface 30b which is in close contact to the corresponding upper tapered surface of the piston 17 in the assembled condition of the sealing device 18. The provision of the two sealing surfaces 30a and 30b of the lower sealing ring 30 can divide the pressure or stress applied axially of the piston 17 by the deformation of the O-ring 31 into the pressure towards the direction perpendicular to the tapered surface and the pressure towards the direction perpendicular to the outer peripheral surface, thus enhancing the sealing effect.

According to the structure of the sealing device 18 as described above, a sealing structure having pressure-proof characteristic of, for example, ten and several thousands kg/cm$^2$ will be achieved. In such a case, when the pressure-proof characteristic below about ten thousands kg/cm$^2$ is required, the upper seal ring 32 may be eliminated to attain the desired sealing effect.

Figure 3:
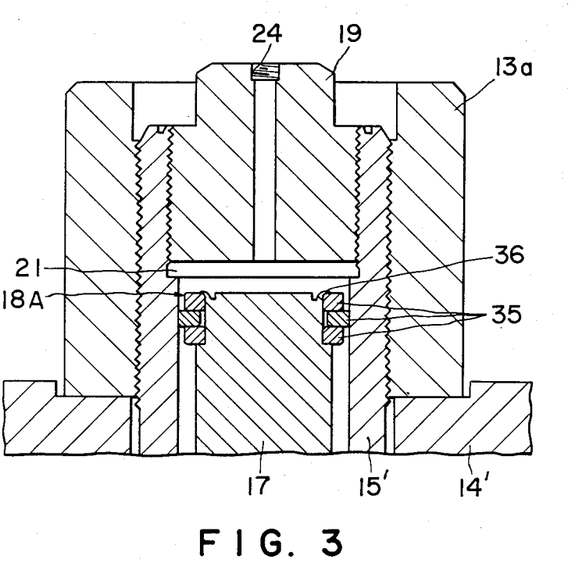

FIG. 3 shows another example of a sealing device 18A, in which a plurality of seal rings 35 are mounted in a multiply laminated manner around the upper outer peripheral surface of the piston 17, and a caulking portion 36 is formed on the piston 17 for securing the uppermost seal ring 35 to ensure the sealing of the pressurized fluid supply into the pressurizing space 21.

Figure 4:
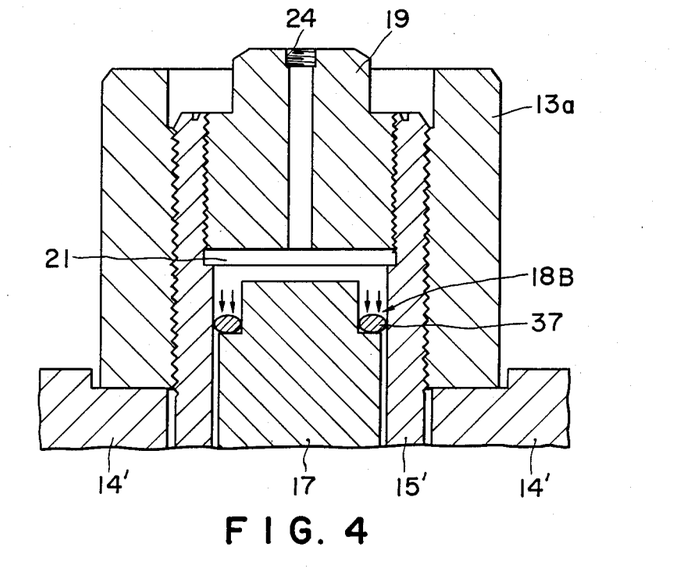

In another example as shown in FIG. 4, a sealing device 18B may comprise an elastic carbon packing 37 located between the outer surface of the piston 17 and the junction bolt body 15', the carbon packing 37 being crushed under pressure to press the inside of the pressurizing space 21 and thus establishing the sealing condition. Various kinds of carbon packings may be used in accordance with the temperature in the hollow portion of the junction bolt body 15'.

Figure 5:
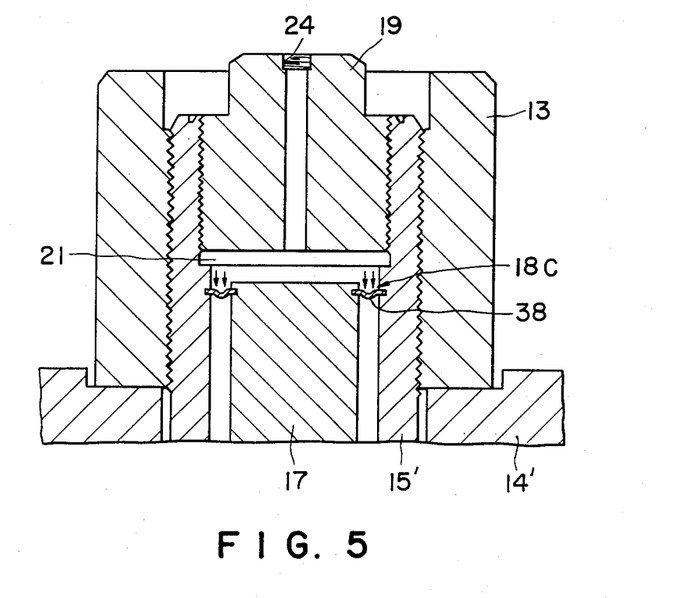

In a further example of a sealing device 18C shown in FIG. 5, the sealing device 18C may be constituted by a diaphragm seal 38 of ring shape, the inner and outer ends of which are embedded into the walls of the piston 17 and the junction bolt body 15', respectively, thereby to sealing the pressurized fluid. The diaphragm seal 38 may be preferably used because of its relatively large allowance against the deformation of the piston 17.

With the example of the sealing devices described above, the members of the sealing members to be laminated or the amounts thereof will be determined in a preferred manner in accordance with the pressure of the pressurized fluid to be utilized.

THE SECOND EMBODIMENT

Figure 6:
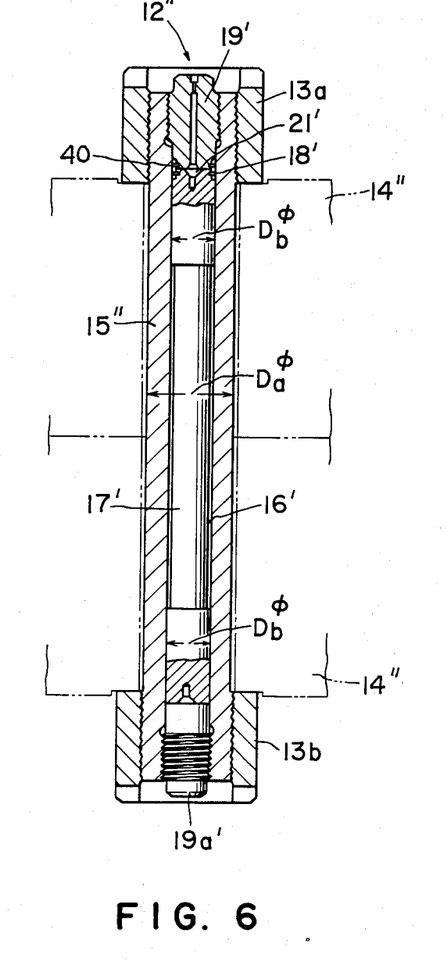
FIG. 6 is a vertical elevation showing one preferred embodiment of the junction bolt actually designed.
Figure 7:
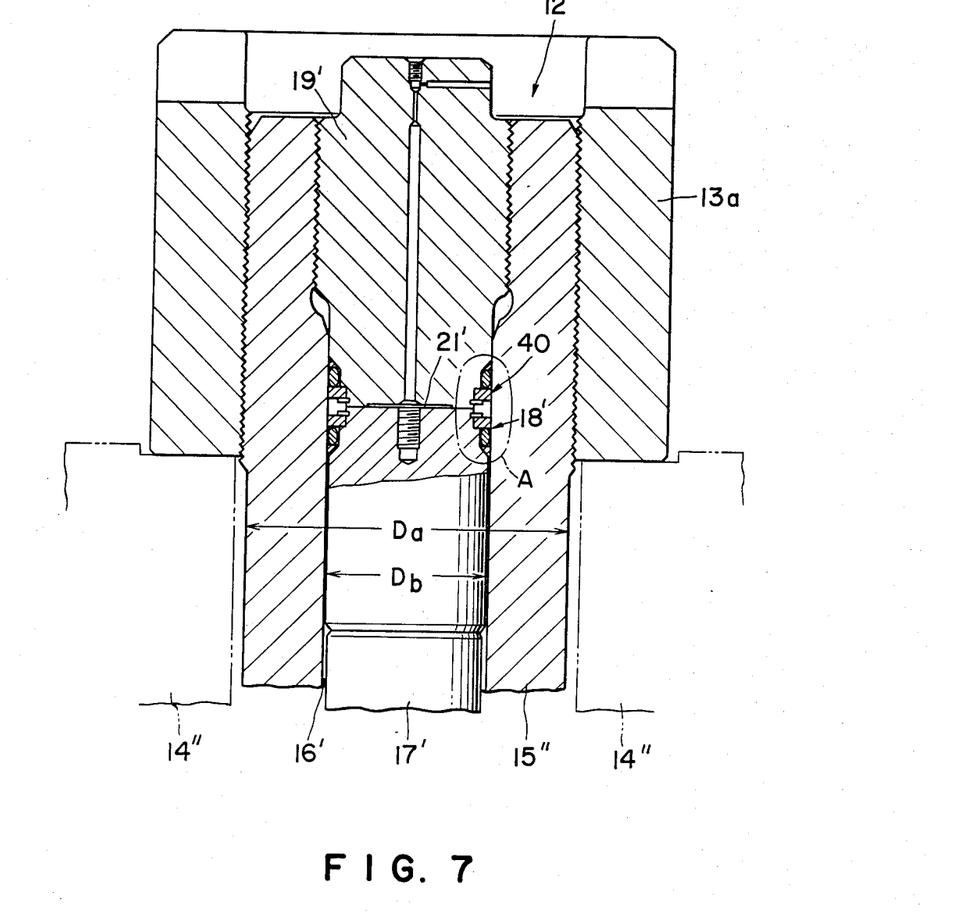
FIG. 7 is also a vertical elevation on an enlarged scale of a portion of the junction bolt shown in FIG. 6.
Figure 8:
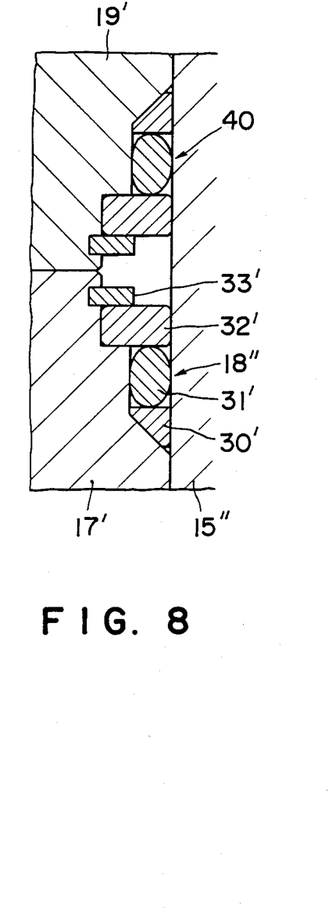
FIG. 8 is an enlarged view of a portion circled by a circle A in FIG. 7.

FIGS. 6 through 8 show sectional views of one example of a junction bolt, actually designed, according to this invention.

With a power generation steam turbine with a capacity of about 500 MW, the thickness of each flange portion 14" of a divided turbine casing is about 500 mm, and the casing provided with the flange portion 14" having a thickness range from about 500 mm to about 700 mm will be used in accordance with the output power of the steam turbine.

The outer diameter Da and the inner diameter (bore diameter) of the junction bolt body 15" are determined as shown in the following table on the basis of the size or dimension of the actually designed junction bolt 12".

TABLE

| Bolt Size (inches) | Bolt Size of Junction Bolt Bolt Size of Junction Bolt Body | |
|---|---|---|
| | Outer Diameter (Da) mm | Inner Diameter (Db) mm |
| 3.0 | 71 | 37.5 |
| 3.5 | 83 | 42.5 |
| 4.0 | 96 | 50.0 |
| 4.5 | 109 | 56.5 |
| 5.0 | 121 | 62.5 |
| 5.5 | 134 | 68.0 |
| 6.0 | 146 | 75.0 |

In the examples shown, the inner hollow hole 16' of the junction bolt body 15", in which the piston 17' is accommodated, are provided with both end openings which are closed by blind plugs 19' and 19a' in screw engagement, and one blind plug 19' is provided with a through hole to which a hose, not shown, is connected to supply the pressurized fluid into the pressurized space 21' formed in the hollow hole 16'.

The sealing device 18' is mounted on the outer peripheral surface of the piston 17', and a sealing device 40 having substantially the same structure as that of the sealing device 18 is mounted on the outer peripheral surface of the blind plug 19' as shown in FIGS. 7 and 8. The sealing devices 18' and 40 also have substantially the same structure as the sealing device 18 shown in FIG. 2, which essentially comprises the lower seal ring 30' of triangular cross-section, the o-ring 31' of hardened rubber, and the upper seal ring 32' of rectangular cross-section, which are vertically laminated in this order on the piston 17' and secured by the stop ring 33.

The flange portions 14' of the turbine casings can be fastened and clamped by the junction bolts 12' by the method described hereinbefore with only the tensioning force applied to the junction bolt body 15' and without subjecting the bolt to shearing force due to the return stress thereof. In that case, it is significant for the matter of design, in application to the steam turbine, that the clamping force ratio of the junction bolt 12" becomes more than 0.75, and the pumping pressure of the pump is below about 10,000 kg/cm$^2$.

It is a remarkable feature in use of the junction bolts according to this invention that the clamping force can be easily adjusted in a short time even during the operation of a power plant such as a steam turbine.

THE THIRD EMBODIMENT

Figure 9:
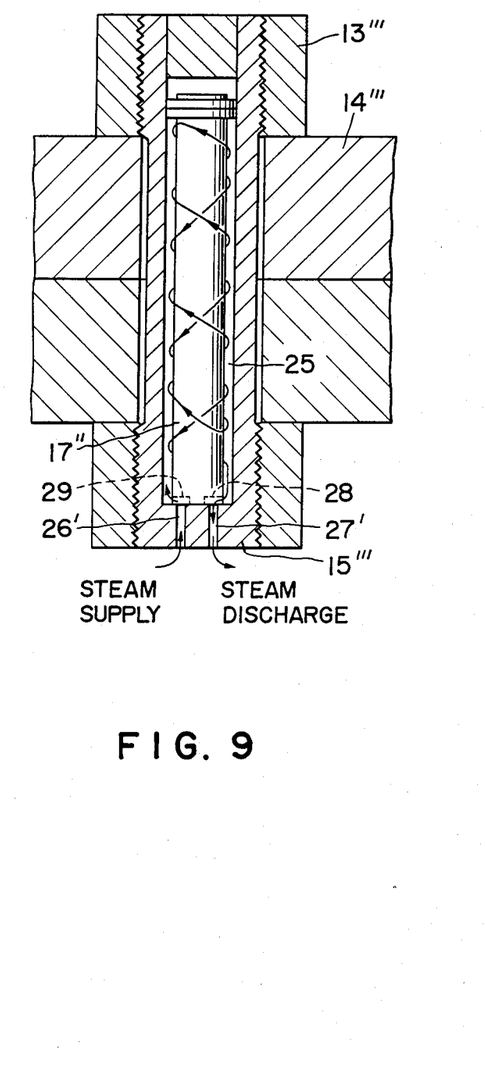
FIG. 9 is also a vertical elevation of the junction bolt used for explaining a bolt clamping method according to this invention.

In a case where a machinery such as the steam turbine described above is continuously operated in the high-temperature condition for a long time, a creep fatigue may occur in the junction bolt, and the clamping force thereof may be reduced as time passes, so that some proper procedure, such as cooling of the joined portions, may be required. In that case, as shown in FIG. 9, a heat medium, such as low temperature steam, will be introduced through the inlet port 26' formed on the lower end of the junction bolt body 15'''. The introduced steam rises, while turning about the piston 17'', is introduced in the temperature adjusting space 25'' to cool the junction bolt body 15''' from the inside thereof and is then discharged outwardly through the outlet-port 27'. The junction bolt body 15''' after being cooled is contracted in the axial direction to contract the clamping nuts 13''' on both sides of the junction bolt and hence to increase the clamping force thereof.

THE FOURTH EMBODIMENT

Figure 10:
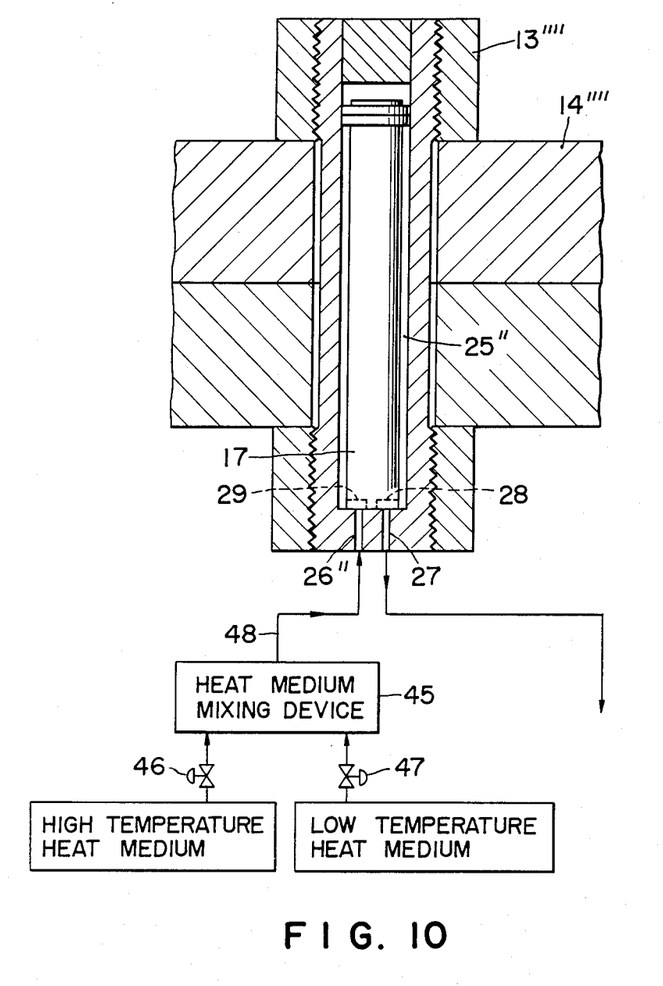
FIG. 10 shows a schematic diagram of a construction for supplying a heat medium to the junction bolt.

Additionally, in order to positively follow the variation in wide range of the operating condition of a machinery, such as steam turbine, the location of a heat medium mixing device 45 such as shown in FIG. 10 so as to variously adjust the temperature of the heat medium would be required, thereby facilitating the temperature adjusting procedure. In detail, a high temperature steam and a low temperature steam as a heat medium are introduced into the heat medium mixing device 45 respectively through adjusting valve 46 and 47 to properly feed the respective heat mediums as occasion demands. The high and low temperature heat mediums are mixed by proper amounts by adjusting degrees of openings of the valves 46 and 47 to obtain a predetermined temperature, and the mixture thus obtained is introduced into the temperature adjusting space 25'' through a feeding duct 48 and the heating medium inlet port 26'' to cool or heat the junction bolt body 15'''', thus increasing or decreasing the clamping force thereof.

For example, even in a case where there is a fear of occurrence of steam leakage during the operation of the steam turbine, the leakage can be prevented by feeding the low temperature heat medium mixture into the temperature adjusting space 25'' to instantaneously increase the clamping force of the junction bolt 15''''. This is based on the fact that, when it is required to cool the junction bolt by the conventional structure of the cooling or heating mechanism for a junction bolt shown in FIGS. 15 and 16, the joined portions, such as flanges in the steam turbine, is also cooled as well as the junction bolt, so that it was difficult to cause clear temperature difference therebetween, thus making it difficult to instantaneously increasing the clamping force. According to the structure of this invention, however, because the object to be cooled is limited only to the junction bolt body, the heat amount required is small, and the heat transfer is smoothly and quickly achieved, thus being capable of increasing the clamping force in a remarkably short time.

THE FIFTH EMBODIMENT

Figure 11:
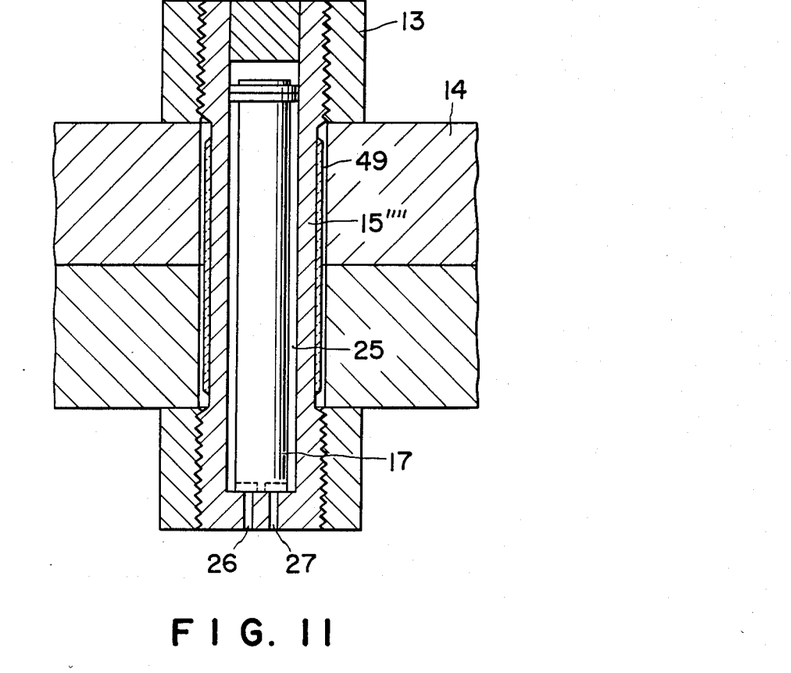
FIG. 11 also shows a vertical elevation of the junction bolt in which a heat insulating material is coated on the outer surface of the bolt body.

In another preferred example, in order to carry out the temperature adjustment of the junction bolt body shown in FIG. 11, in a shorter time, it may be possible to restrict the affect of the external heat transfer by coating a heat insulating material 49 such as ceramics on the outer surface of the junction bolt body 15''''', thereby limiting the heat transfer from the inside of the bolt hole to the junction bolt body 15'''''to reduce the heat transfer from or to the surroundings of the junction bolt body 15''''', thus completing the temperature adjustment more smoothly and quickly.

As described hereinbefore, the junction bolt according to this invention is provided with a structure for axially extending the junction bolt body by introducing a pressurized fluid thereinto and a structure for adjusting the temperature of the junction bolt body to a predetermined temperature by introducing a heat medium thereinto, so that the junction bolt body can be extended by feeding the pressurized fluid at a predetermined temperature, and in that condition, the clamping force of the junction bolt can be easily adjusted by lightly screwing the clamping nut. The invention is thus capable of shortening the working time for clamping or loosening the junction bolt in comparison with the conventional structure. This further results in the shortening of the periodic inspection time of the machinery as well as in the improvement of the working or operating efficiency of the equipment.

In another aspect, according to the method for adjusting the clamping force of the junction bolts, of this invention, the clamping force of the junction bolt can be easily and promptly adjusted in response to frequent variation or change of the operating condition even in the assembling or disassembling time of the members to be joined as well as the usual operating time, thus remarkably improving the follow-up response to the variation of the operating condition of the machinery.

Moreover, since the item for the management in the clamping force adjusting time to obtain a predetermined clamping force is only the pressure of the pressurized fluid, the clamping force to be required can be determined without being influenced by any other operational item. Accordingly, troublesome workings or operations in use of complicated measuring equipments or instruments required in the conventional method can be substantially eliminated. Moreover, in the actual operation, the skill or experience of operators less affects the adjustment of the clamping force of the junction bolt. It becomes therefore possible to adjust and set the clamping force with high precision and high reliability.

While this invention has been described with reference to the embodiments shown and described herein, it is not intended that certain details thereof should limit the scope of this invention, and obvious modifications and changes will fall within the scope of the appended claims except insofar as limited by the prior art.

What is claimed is:

1. A junction bolt adapted to clamp members to be joined together by the use of clamping nuts, said junction bolt comprising:
   (a) a bolt body provided with an inner axial hollow hole having a first open end and a second end;
   (b) a piston member coaxially located in said inner axial hollow hole with a space between the outer peripheral surface of said piston member and an inner wall of said bolt body defining said inner axial hollow hole;
   (c) a plug means adapted to close said first, open end of said inner axial hollow hole;
   (d) a sealing means located on the outer peripheral surface of said piston member to separate said space into a first space as a pressurizing space into which, in use, a pressurizing fluid is introduced and a second space as a temperature adjusting space into which, in use, a heat medium is introduced;
   (e) means for introducing a pressurized fluid into said first space; and
   (f) means for introducing a heat medium into said second space, said means for introducing a heat medium into said second space comprising a port provided in said second end of said inner axial hollow hole.

2. The junction bolt according to claim 1 wherein said sealing means is located on the outer peripheral surface of said piston member at an end on the side of said pressurizing space so as to reduce an inner volume thereof.

3. The junction bolt according to claim 1 wherein:
   (a) said pressurizing space is formed at a position corresponding to a position at which one of the clamping nuts is to be screwed and
   (b) said bolt body is axially extended by introducing the pressurized fluid into said pressurizing space.

4. The junction bolt according to claim 1 wherein said sealing means comprises one of a seal ring, a carbon packing, and a diaphragm seal.

5. The junction bolt according to claim 1 wherein said sealing means comprises a combination of:
   (a) a seal ring having a substantially triangular cross section for providing two-surface sealing structure and
   (b) an o-ring disposed on said seal ring.

6. The junction bolt according to claim 1 wherein said sealing means comprises a combination:
   (a) a first elastic seal ring having a substantially triangular cross section for providing two-surface sealing structure;
   (b) an o-ring made of hard rubber materials; and
   (c) a second elastic seal ring,
   (d) said first elastic seal ring, said o-ring, and said second elastic seal ring being laminated in that order.

7. The junction bolt according to claim 1 wherein said means for introducing the pressurized fluid into said pressurizing space is an axial through hole formed in said plug means.

8. The junction bolt according to claim 1 wherein said piston member is provided with a communication groove at one end thereof on the side of said second end of said hollow hole for discharging the pressurized fluid leaking from said pressurized space into said temperature adjusting space outwardly of said bolt body.

9. The junction bolt according to claim 1 wherein said plug means is secured to said first end of said inner axial hollow hole by means of screw engagement.

10. The junction bolt according to claim 1 wherein said plug means is secured to said first end of said inner axial hollow hole by means of electron-beam welding.

11. A junction bolt adapted to clamp members to be joined together by the use of clamping nuts, said junction bolt comprising:
  (a) a bolt body provided with an inner axial hollow hole having a first, open end and a second end, an outer surface of said bolt body being coated with a heat insulating material;
  (b) a piston member coaxially located in said inner axial hollow hole with a space between the outer peripheral surface of said piston member and an inner wall of said bolt body defining said inner axial hollow hole;
  (c) a plug means adapted to close said first, open end of said inner axial hollow hole;
  (d) a sealing means located on the outer peripheral surface of said piston member to separate said space into a first space as a pressurizing space into which, in use, a pressurizing fluid is introduced and a second space as a temperature adjusting space into which, in use, a heat medium is introduced;
  (e) means for introducing a pressurized fluid in said first space; and
  (f) means for introducing a heat medium into said second space.

12. The junction bolt according to claim 11 wherein said sealing means is located on the outer peripheral surface of said piston member at an end on the side of said pressurizing space so as to reduce an inner volume thereof.

13. The junction bolt according to claim 11 wherein:
  (a) said pressurizing space is formed at a position corresponding to a position at which one of the clamping nuts is to be screwed and
  (b) said bolt body is axially extended by introducing the pressurized fluid into said pressurizing space.

14. The junction bolt according to claim 11 wherein said sealing means comprises one of a seal ring, a carbon packing, and a diaphragm seal.

15. The junction bolt according to claim 11 wherein said sealing means comprises a combination of:
  (a) a seal ring having a substantially triangular cross section for providing two-surface sealing structure and
  (b) an o-ring disposed on said seal ring.

16. The junction bolt according to claim 11 wherein said sealing means comprises a combination of:
  (a) a first elastic seal ring having a substantially triangular cross section for providing two-surface sealing structure;
  (b) an o-ring made of hard rubber materials; and
  (c) a second elastic seal ring,
  (d) said first elastic seal ring, said o-ring, and said second elastic seal ring being laminated in that order.

17. The junction bolt according to claim 11 wherein said means for introducing the pressurized fluid into said pressurizing space is an axial through hole formed in said plug means.

18. The junction bolt according to claim 11 wherein said means for introducing a heat medium into said second space comprises a port provided in said second end of said inner axial hollow hole.

19. The junction bolt according to claim 11 wherein said piston member is provided with a communication groove at one end thereof on the side of said second end of said hollow hole for discharging the pressurized fluid leaking from said pressurized space into said temperature adjusting space outwardly to said bolt body.

20. The junction bolt according to claim 11 wherein said plug means is secured to said first end of said inner axial hollow hole by means of screw engagement.

21. The junction bolt according to claim 11 wherein said plug means is secured to said first end of said inner axial hollow hole by means of electron-beam welding.

* * * * *